United States Patent
Zhang et al.

(10) Patent No.: US 7,154,670 B2
(45) Date of Patent: Dec. 26, 2006

(54) METHODS AND APPARATUS FOR POLARIZATION CONTROL

(75) Inventors: Hongbin Zhang, Marlboro, NJ (US); Li Liu, Carneys Point, NJ (US); R. Brian Jander, Freehold, NJ (US); Alexei N. Pilipetskii, Colts Neck, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 308 days.

(21) Appl. No.: 10/796,930

(22) Filed: Mar. 10, 2004

(65) Prior Publication Data

US 2005/0199787 A1    Sep. 15, 2005

(51) Int. Cl.
*G02B 27/28*    (2006.01)

(52) U.S. Cl. .................... 359/501; 359/497; 385/11

(58) Field of Classification Search ............ None
See application file for complete search history.

(56) References Cited

U.S. PATENT DOCUMENTS

| | | | | |
|---|---|---|---|---|
| 5,111,322 | A | 5/1992 | Bergano et al. | 398/74 |
| 5,212,743 | A | 5/1993 | Heismann | 385/11 |
| 6,134,033 | A | 10/2000 | Bergano et al. | 398/184 |
| 6,342,961 | B1 | 1/2002 | Bergano et al. | 398/79 |
| 6,384,956 | B1 * | 5/2002 | Shieh | 359/256 |
| 6,459,515 | B1 | 10/2002 | Bergano | 398/79 |
| 2003/0081874 | A1 | 5/2003 | Yao | 385/11 |

FOREIGN PATENT DOCUMENTS

EP    0310174    4/1989

OTHER PUBLICATIONS

Heismann et al., Broadband Reset-Free Automatic Polarisation Controller, Electronics Letters, vol. 27, No. 4, Feb. 1991, pp. 377-379.
Hill et al., Optical Polarization Division Multiplexing at 4 Gb/s, IEEE Photonics Technology Letters, vol. 4, No. 5, May 1992, pp. 500-502.
Heismann et al., Automatic Polarisation Demultiplexer for Polarisation-multiplexed Transmission Systems, Electronics Letters, vol. 29, No. 22, Oct. 1993, pp. 1695-1966.
Agilent 11896A and 8169A Polarization Controllers Product Overview, Agilent Technologies, Inc. © 1994, 2002.
Heismann, Analysis of a Reset-Free Polarization Controller for Fast Automatic Polarization Stabilization in Fiber-optic Transmission Systems, Journal of Lightwave Technology, vol. 12, No. 4, Apr. 1994, pp. 690-699.
Bergano et al., Wavelength Division Multiplexing in Long-Haul Transmission Systems, Journal of Lightwave Technology, vol. 14, No. 6, Jun. 1996, pp. 1299-1308.
Endless Polarization Stabilizer, General Photonics Corp., © 2000. Retrieved from the internet: <www.generalphotonics.com/PolaStay.htm> on Jan. 15, 2004.
Ito et al., 6.4 Tb/s (160×40 Gb/s) WDM Transmission Experiment with 0.8 bit/s/Hz Spectral Efficiency, Proceedings ECOC, vol. 5, Sep. 2000.

(Continued)

*Primary Examiner*—Arnel C. Lavarias (57) ABSTRACT

Methods and apparatus of performing polarization control for optical transmissions. The methods and apparatus enable polarization control devices to achieve a desired output state of polarization regardless of the input state of polarization. The desired state of polarization can be achieved by rotating waveplates in a polarization controller in a sequential fashion. Each waveplate may be continually adjusted or dithered so long as the feedback signal satisfies a feedback condition. Once the feedback signal exceeds the feedback condition, the next waveplate in the polarization controller is adjusted. This enables the methods and apparatus to rapidly adjust the state of polarization away from dead spots and minimize loss control problems.

51 Claims, 9 Drawing Sheets

OTHER PUBLICATIONS

Shieh et al., Dynamic Eigenstates of Polarization, IEEE Photonics Technology Letters, vol. 13, No. 1, Jan. 2001, pp. 40-42.
Lithium Niobate Polarization Controller; Preliminary Data Sheet, Agere Systems, © Jul. 2002.
Sunnerud et al., Polarization-Mode Dispersion in High-Speed Fiber-Optic Transmission Systems, Journal of Lightwave Technology, vol. 20, No. 12, Dec. 2002, pp. 2204-2219.
Ikeda et al., Endless Tracking Polarization Controller, Furukawa Review No. 23, Apr. 2003.
Davidson et al., Polarization Tracking Receiver Demonstration Over Transoceanic Distance, Retrieved from the internet:<www.furukawa.co.jp/review/fr023/fr23-07.pdf> on Dec. 8, 2003.
Shih-tse Hu et al., Low-PDG Raman Amplification via 10 GHz Polarization Sweeping with LiNbO3 Phase Modulator, Optical Society of America, © 2002.
Automated Endless Polarization Control System, Ipitek, Integrated Photonics Technology, © 2002.
Takanori Okoshi; "Polarization-State Control Schemes for Heterodyne or Homodyne Optical Fiber Communications"; Dec. 1985; Journal of Lightwave Technology, vol. LT-3, No. 6; pp. 1232-1237.
European Search Report mailed Jun. 22, 2005 in connection with corresponding European Appln. No. 05251430.4.

* cited by examiner

(PRIOR ART)

METHODS AND APPARATUS FOR POLARIZATION CONTROL

BACKGROUND OF THE INVENTION

The present invention is generally applicable to communications systems. More particularly, the present invention is applicable to polarization control in optical communications systems that suffer from dead spot problems.

Communications systems employing optical equipment have long been used to provide high bandwidth transmission of vast amounts of data. Enhanced signaling techniques have been implemented in order to achieve even greater throughput, particularly for long distance ("long haul") transmission. One important technique employs polarization. For an optical signal, polarization, or the state of polarization (SOP), represents the amplitude and direction of the electric field vector of the light signal.

By way of example only, an aggregate or composite optical signal may transmit numerous channels, each having a different wavelength and a different polarization. The channels can be polarized so that, e.g., all even channels are polarized to a first polarization state and all odd channels are polarized to a second polarization state. The first and second polarization states may be orthogonal to one another, substantially reducing unwanted cross talk between adjacent channels. Orthogonal polarization, also known as "orthogonal launch," is more fully explained in U.S. Pat. No. 6,134,033, entitled "Method and Apparatus for Improving Spectral Efficiency in Wavelength Division Multiplexed Transmission Systems" and U.S. Pat. No. 6,459,515, entitled "Method and Apparatus for Transmitting a WDM Optical Signal Having States of Polarization That Are Pairwise Orthogonal," the entire disclosures of which are fully incorporated by reference herein.

A critical issue when employing polarized signals is maintaining the SOP along the transmission path. For example, as signals are transmitted over optical fiber, the SOP may fluctuate based on a variety of factors, such as the type of fiber, the length of the fiber, manual handling, etc. Single-mode fibers, e.g., fibers that propagate only one mode above a cutoff wavelength, may not preserve the SOP of signals propagating through the optical fiber. In order to address SOP fluctuations, polarization-maintaining equipment is necessary. However, employing polarization-maintaining equipment throughout the transmission system may be extremely expensive or impractical. Thus, polarization controllers may be employed instead to alter the polarization state of the optical signal.

Polarization controllers receive an input SOP at a point along the transmission path and output an optical signal that will have a desired SOP at some later point along the transmission path. Typically, a polarization controller is composed of one or more "waveplates.". As used herein, optical elements that exhibit birefringence are collectively referred to as waveplates. Birefringence is the separation of an incident light beam into a pair of diverging beams, known as "ordinary" and "extraordinary" beams. The velocities of the ordinary and extraordinary beams through the birefringent material vary inversely with their refractive indices. The difference in velocities gives rise to a phase difference when the two beams recombine. Waveplates can generate full, half and quarter-wave retardations when the phase difference equals whole, half and quarter wavelengths. Waveplates can also generate any arbitrary fractional-wave retardations. Various devices may be employed in a polarization controller, and modeled as a waveplate or combination of waveplates. Controller implementations can be classified into two types based on how the waveplate(s) operates: (1) devices based on control of waveplate birefringence while the effective waveplate axis is fixed, and (2) devices based on controlling the orientation of the waveplate about its axis while the birefringence is unchanged. Liquid crystal and fiber squeezer devices may fall into the first category while $LiNbO_3$ waveguide devices and fiber loop devices may fall into the second category.

Figure 1A:
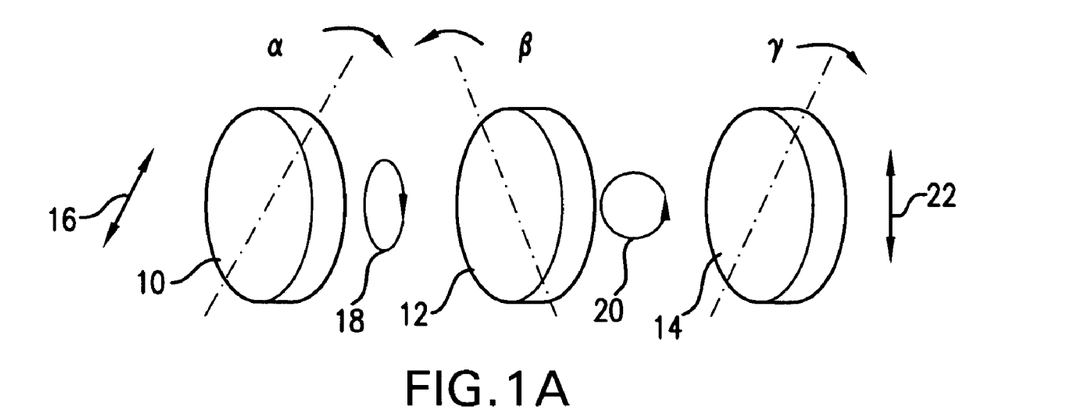
FIG. 1(a) illustrates a set of waveplates that are used to change the state of polarization for an input optical signal.

FIG. 1(a) illustrates an exemplary set of three (3) waveplates 10, 12 and 14 that can have their orientations (angles of rotation $\alpha$, $\beta$, $\gamma$) changed while the birefringence is unchanged. As seen in the figure, an input SOP 16 can be modified by changing the orientation of the waveplate 10 to achieve a first intermediate SOP 18. The first intermediate SOP 18 can be modified by changing the orientation of the second waveplate 12 to achieve a second intermediate SOP 20. The second intermediate SOP 20 can be modified by changing the orientation of the third waveplate 14 to achieve an output SOP 22.

Figure 2A:
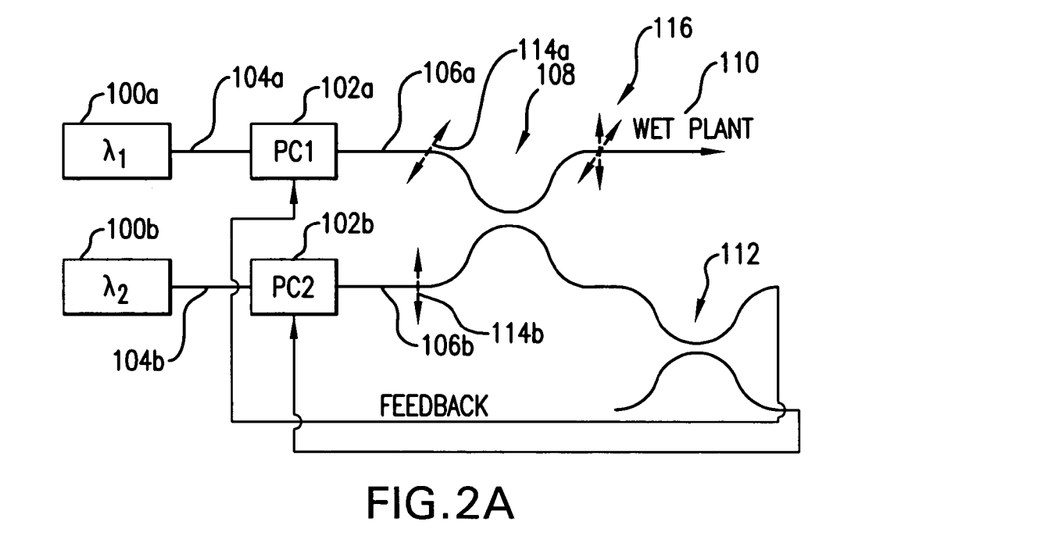
FIG. 2(a) illustrates a schematic diagram of a polarization multiplexer including a pair of polarization controllers for polarizing signals to be launched into a conventional optical transmission system.
Figure 2B:
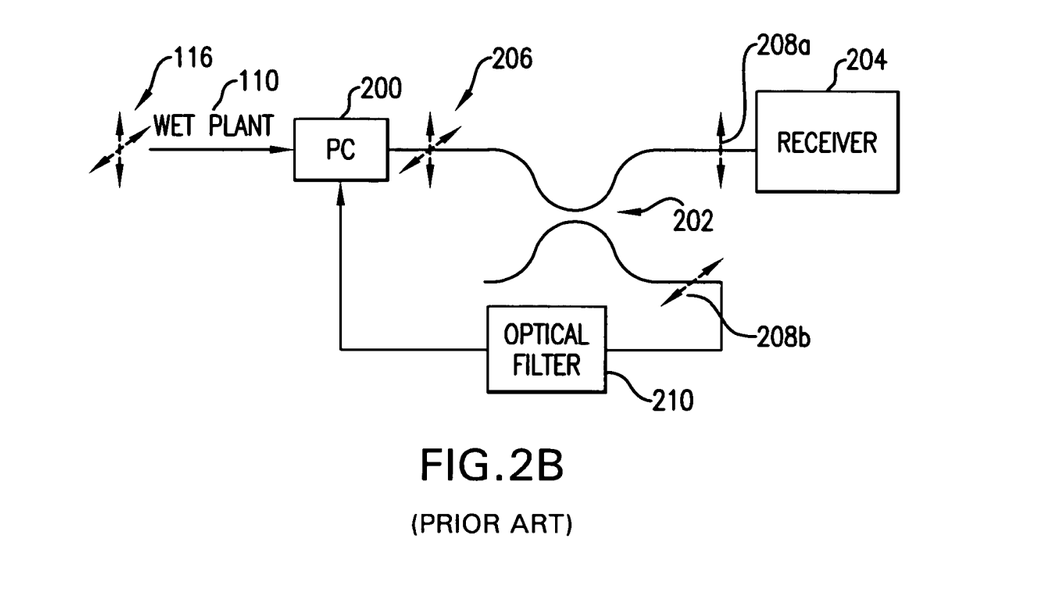
FIG. 2(b) illustrates a schematic diagram of a polarization demultiplexer including a demultiplexer and a polarization controller for receiving polarized signals from a conventional optical transmission system.

FIG. 2(b) illustrates a conventional single-channel polarization tracking receiver/filter implementing a polarization controller 200, which receives the multiplexed signal 116 from the wet plant 110. The polarization controller 200 operates on the multiplexed signal 116 and outputs a signal 206 to a polarization splitter 202. The polarization splitter 202 can separate a single channel (e.g., signal 208a) from the signal 206. The signal 208a is then provided to a receiver 204. A signal 208b is passed through an optical filter 210 and transmitted to the polarization controller 200 as a feedback signal. While only one polarization controller is shown in FIG. 2(b), it should be understood that separate polarization controllers 200 are employed for each channel.

One major concern in such transmission systems is the situation where the input SOP of an optical signal results in a feedback signal that is insensitive to the dithering or phase shifting of the rotational angle of the waveplate. This is known as "loss control." The inventors of the instant application have identified loss control problems in both simulations and experiments. Others have also acknowledged loss control in the past, and have claimed the problem to be unavoidable. See, for example, Shieh et al., "Dynamic Eigenstates of Polarization," IEEE Photonics Technology Letters, Vol. 13, No. 1, pp. 40–42, January 2001, which is fully incorporated by reference herein. If loss control is not addressed in the polarization controller (either on the transmit side or on the receive side), it may not be possible to achieve a desired output SOP. The states that create loss control problems are known as "dead spots." It is difficult to move away from a dead spot once it has been reached because conventional polarization controllers are not capable of making appropriate adjustments to the waveplates or other devices that they use. When a dead spot happens for a specific combination of waveplates in the polarization controller and a specific input SOP, small variations in the input SOP will require large changes to one or more of the waveplates to transform the input SOP to the desired output SOP. With a conventional dithering algorithm, however, the waveplates cannot be rotated by a large angle. Thus, in that situation, the output SOP may move away from a desired output SOP when the input SOP varies, resulting in a loss control situation. Dead spots can seriously degrade system performance and result in loss of received data due to co-channel interference and other problems.

Some conventional polarization controllers employ polarimeters. A polarization controller based on a polarimeter needs to know the birefringence transfer function from an input polarization state to the desired output polarization state through the controller device and transmission line (e.g., a single mode fiber). Determining the exact birefringence transfer function is not feasible in actual commercial systems. Thus, achieving a desired output polarization state is problematic. Other conventional polarization controllers have used a simple dithering algorithm based on the feedback signal from a polarization splitter to adjust the SOP. The dither algorithm is insensitive to, e.g., aging-induced drifting of controller device parameters such as DC bias voltage. For examples of polarization controllers employing the conventional dither algorithm, see "Analysis of a Reset-Free Polarization Controller for Fast Automatic Polarization Stabilization in Fiber-optic Transmission Systems," Journal of Lightwave Technology, Vol. 12, No. 4, April 1994, and U.S. Pat. No. 5,212,743, both to Fred L. Heismann, which are fully incorporated by reference herein. In the Heismann references, a reset-free polarization controller is employed, which consists of several quarter-waveplates (QWP) and half-waveplates (HWP).

Figure 3:
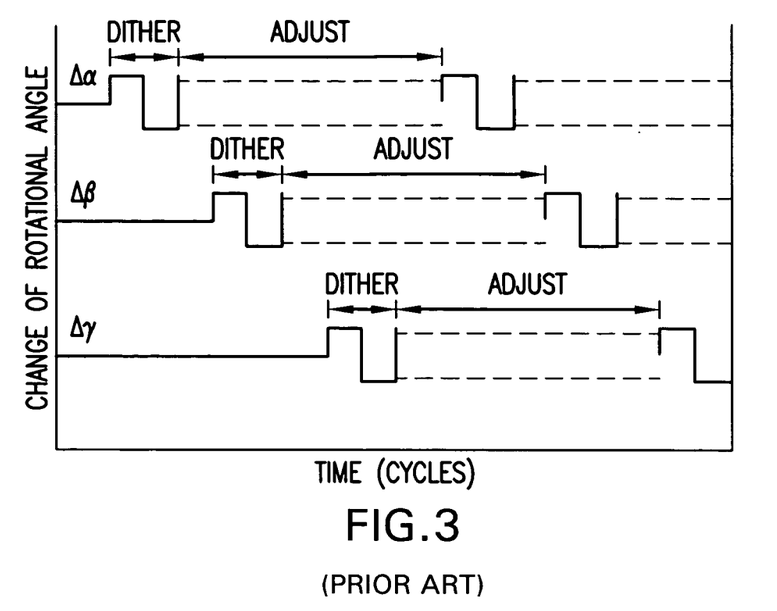
FIG. 3 illustrates a conventional polarization controller dithering algorithm.

Specifically, a HWP is sandwiched between a pair of QWPs. The conventional approach is to dither the rotational angle of each waveplate as graphically illustrated in FIG. 3. The angle of the waveplate is dithered/adjusted by a small step-size ($\Delta\alpha$, $\Delta\beta$, or $\Delta\gamma$) in sequence. More specifically, the angle $\alpha$ of the first waveplate is dithered/adjusted (e.g., by mechanically rotating the waveplate) for a fixed time period, then the angle $\beta$ of the second waveplate is dithered/adjusted for a fixed time period, and finally the angle $\gamma$ of the third waveplate is dithered/adjusted for a fixed time period. Thus, each waveplate is independently dithered and adjusted for a fixed amount of time. Unfortunately, this approach may not have a sufficient control speed to handle fluctuations in the input SOP. This can result in a loss control problem.

There exist two situations that explain loss control and consequent reduction of the control speed. As used herein, control speed means that a polarization controller can track any random movement of the input SOP with a specific speed such that the desired output SOP is locked at some later point along the transmission path. In the first situation, there is little or no absolute response by dithering a waveplate (controlling the waveplate angle). In other words, the SOP may not change regardless of how much a particular waveplate is dithered. As an example, a HWP controller only transforms right (or left) circular polarization state at the input to left (or right) circular polarization state at the output independent of the rotation angle of the waveplate, which is the control parameter.

Figure 1B:
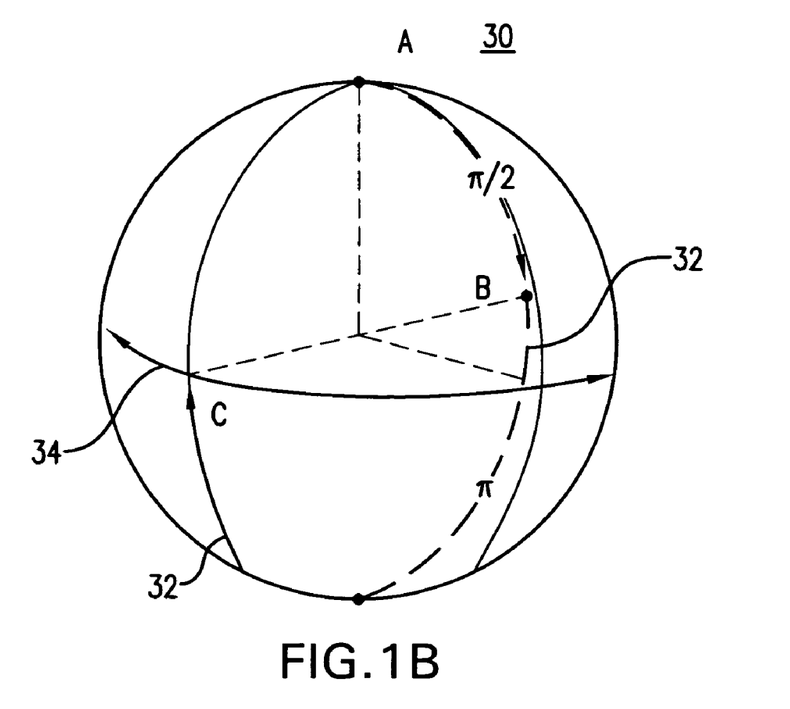
FIG. 1(b) illustrates an exemplary Poincare chart tracing the change from an input left circular polarization state to an output linear polarization state.

Second, there is only one direction of response by dithering any of the waveplates within the polarization controller. On a polarization plot using a Poincare chart, the SOP can be represented as a vector. Poincare charts are used to plot states of polarization in a three-dimensional format. Movement from one SOP to another SOP gives a trace on the Poincare chart. For an example, as shown in FIG. 1(b), a Poincare chart 30 traces the change in SOP from a left circular polarization state at the input of a polarization controller to a linear polarization state at the output, using a QWP-HWP polarization controller. The left circular polarization state is at point A on the sphere. Using the QWP and HWP waveplates alters the input SOP to a linear polarization state along the equatorial plane by means of a movement 32. Rotating/dithering either the QWP or the HWP can only generate a movement 34 along the circumference of the equatorial plane, and there is no movement along a longitudinal direction. Thus, a conventional polarization controller loses the tracking ability along the longitudinal direction.

The two situations discussed above are referred to herein as loss control ("LC") effects. Because conventional polarization controller processes make changes to each waveplate for a fixed period of time, they are unable to sufficiently handle loss control problems. Thus, there is a need for new controller methods to address loss control problems.

SUMMARY OF THE INVENTION

In accordance with aspects of the present invention, a polarization control method is provided. In the method, an input optical signal is received at a first waveplate. The input optical signal has a state of polarization associated therewith. A first rotation direction is selected for the first waveplate. The first waveplate is rotated a first step amount along the first rotation direction to adjust the state of polarization of the input optical signal. A feedback signal is monitored to assess the efficacy of rotating the first waveplate. Rotation of the first waveplate is continued while the feedback signal satisfies a first condition.

In one example, the first condition is associated with feedback minimization. In another example, the first condition is associated with feedback maximization. In a further example, continuing the rotation of the first waveplate includes incrementing by the first step amount for each rotation of the first waveplate. In one alternative, the first step amount is at least one degree. In another alternative, the first step amount is less than 10 degrees. In a third alternative, the first step amount is between about two and three degrees.

In an alternative, the method preferably includes further rotating the first waveplate along the first rotation direction if the feedback signal satisfies a second condition, selecting a reverse rotation direction if the feedback signal does not satisfy the second condition, and rotating the first waveplate a second step amount along the reverse direction if the feedback signal does not satisfy the second condition. This sub-process desirably occurs prior to continuing the rotation while the first condition is satisfied.

In a further alternative, the method preferably includes ceasing the continued rotation of the first waveplate once the feedback signal does not satisfy the first condition. In this case, a second waveplate may be selected. Then an initial direction of rotation may be selected for the second waveplate. Next, the second waveplate may be rotated along the initial direction of rotation a second step amount to adjust the state of polarization. The feedback signal is monitored to assess the efficacy of rotating the second waveplate. In accordance with this alternative, the second waveplate may continue to be rotated while the feedback signal satisfies a second condition.

In accordance with aspects of the present invention, a method of controlling a state of polarization is provided. In the method, a plurality of waveplates is provided. A first one of the plurality of waveplates is continually adjusted along a first rotation direction while a feedback signal satisfies a first condition. Adjusting the first waveplate ceases if the feedback signal does not satisfy the first condition. A second one of the plurality of waveplates is continually adjusted along a second rotation direction while the feedback signal satisfies a second condition. Adjusting the second waveplate ceases if the feedback signal does not satisfy the second condition. A third one of the plurality of waveplates is continually adjusted along a third rotation direction while the feedback signal satisfies a third condition. Adjusting the third waveplate ceases if the feedback signal does not satisfy the third condition.

In one example, the first, second and third rotation directions are all clockwise. In another example, the first, second and third rotation directions are all counterclockwise. In a further example, the waveplates are arranged in a serial fashion and are adjusted sequentially. Preferably, the first, second and third conditions are equivalent. More preferably, the first, second and third conditions are selected such that the state of polarization is confined within a zone of acceptability. The zone of acceptability may represent about a −20 dB suppression of unwanted orthogonal polarization, and desirably represents a suppression between −5 dB and −40 dB. Alternatively, the zone of acceptability is selected to minimize loss control effects.

In accordance with aspects of the present invention, a polarization control system is provided. The system comprises a first optical transmission medium, a plurality of waveplates, a second optical transmission medium, and polarization control logic. The first optical transmission medium is capable of receiving an input optical signal having an input state of polarization. The plurality of waveplates is operatively connected together. A first one of the plurality of waveplates is operable to receive the input optical signal from the first optical transmission medium. The second optical transmission medium is capable of receiving an output optical signal having an output state of polarization from a last one of the plurality of waveplates. The polarization control logic is operable to modify the input state of polarization so that the output state of polarization is obtained to have a predetermined polarization criterion. The polarization control logic is further operable to select a first direction of rotation for the first waveplates, to rotate the first waveplate a first step amount along the first direction of rotation to adjust the input state of polarization, to monitor a feedback signal to assess the efficacy of rotating the first waveplates, and to continue rotating the first waveplate while the feedback signal satisfies a first condition.

Various arrangements of waveplates are possible. In an example, there are between five and eight waveplates. In another example, there are between three and twelve waveplates. The waveplates may be arranged in a serial fashion. They may also be adjusted sequentially by the polarization control logic. Preferably, each of the waveplates functions as a quarter wave plate. The waveplates are preferably selected from the group consisting of a LiNbO$_3$ component, a liquid crystal, a fiber loop, and a fiber squeezer. In another example, the predetermined polarization criterion is a zone of acceptability.

In accordance with aspects of the present invention, a polarization control system is provided. The system comprises a first optical transmission medium, a plurality of waveplates, a second optical transmission medium, and polarization control logic. The first optical transmission medium is capable of receiving an input optical signal having an input state of polarization. The plurality of waveplates is operatively connected together. A first one of the plurality of waveplates is operable to receive the input optical signal from the first optical transmission medium. The second optical transmission medium is capable of receiving an output optical signal having an output state of polarization from a last one of the plurality of waveplates. The polarization control logic is operable to modify the input state of polarization such that the output state of polarization is obtained to have a predetermined polarization criterion. The polarization control logic is further operable to continually adjust the first waveplate along a first rotation direction while a feedback signal satisfies a first condition, to cease adjusting the first waveplate if the feedback signal does not satisfy the first condition, to continually adjust a second one of the plurality of waveplates along a second rotation direction while the feedback signal satisfies a second condition, to cease adjusting the second waveplate if the feedback signal does not satisfy the second condition, to continually adjust a final waveplate along a last rotation direction while the feedback signal satisfies a third condition, and to cease adjusting the final waveplate if the feedback signal does not satisfy the condition.

In accordance with aspects of the present invention, a polarization control apparatus is provided. The apparatus comprises a plurality of waveplates, polarization control logic, and a feedback means. The plurality of waveplates are operatively connected together. A first one of the plurality of waveplates is operable to receive an input optical signal having an input state of polarization. The polarization control logic is operable to modify the input state of polarization such that an output state of polarization is obtained at a last one of the plurality of waveplates. The output state of polarization has a predetermined polarization criterion. The feedback means is operable to provide feedback information from the plurality of waveplates to the polarization control logic. The polarization control logic is further operable to select a first direction of rotation for the first waveplate, to rotate the first waveplate a first step amount along the first direction of rotation to adjust the input state of polarization, to monitor the feedback information to assess the efficacy of rotating the first waveplate, and to continue rotating the first waveplate while the feedback information satisfies a first condition.

BRIEF DESCRIPTION OF THE DRAWINGS

For purposes of illustrating various aspects of the invention and to provide a further understanding of the method and system of the invention, together with the detailed description, the drawings show forms that are presently preferred. It should be understood, however, that the invention is not limited to the precise arrangements and instrumentalities shown.

FIGS. 7(a)(1)–7(c)(2) illustrate three-dimensional state-of-polarization plots using Poincare sphere charts.

DETAILED DESCRIPTION

The present invention addresses loss control ("LC") problems in order to minimize dead spots in the transmission of polarized signals. In accordance with aspects of the present invention, polarization control methods are provided for use with polarization control equipment. As discussed above, conventional polarization control processes manipulate waveplates sequentially for fixed periods of time. It has been discovered that a more flexible approach yields significant and unanticipated benefits over conventional techniques, significantly minimizing LC effects.

For the first LC effect described above, namely a lack of absolute response by dithering a waveplate, it is desirable to increase the dither step-size of the waveplate when the response (or feedback signal) becomes smaller. In accordance with aspects of the present invention, an adaptive dither algorithm is used because the dither step-size is adjusted according to the response of the waveplate. However, it is difficult to estimate the optimal step-size. In an overcompensation situation, an unnecessarily large dither step-size allows the output SOP to deviate too far away from the desired position. On the other hand, insufficient dither step-size operates too slowly to recover the response. The waveplate cannot be moved far enough away from the dead spot by an insufficient dither step-size.

For the second LC effect, namely that there is only one direction of response by dithering all of the waveplates within a polarization controller, the number of waveplates is preferably increased to reduce the probability that all of the waveplates have a response in the same direction. However, the more waveplates employed, the less time each waveplate is rotated in a conventional system because they are dithered in sequence for fixed periods of time. Because some of the waveplates may not have a response, the efficacy of a conventional polarization controller may even be reduced by adding more waveplates.

FIG. 2(a) illustrates an orthogonal launch transmission system implementing polarization controllers. Inputs 100a,b transmit signals to polarization controllers 102a,b along fibers 104a,b, which may be single mode fibers. The pair of polarization controllers 102a,b operate on the input signals and pass optical signals 114a,b along a second pair of fibers 106a,b. The signals 114a,b are then multiplexed together by a multiplexer ("MUX") 108 to form a multiplexed signal 116. The multiplexed signal 116 is transmitted through an undersea optical cable (or "wet plant") 110. A second portion of the multiplexed signal 116 is split by a polarization splitter 112, and used to provide feedback to the pair of polarization controllers 102a,b.

It has been discovered that it is possible to remove the LC effects by continuing to dither the orientations of selected waveplates while bypassing or cutting short the dithering of other waveplates. For the first LC effect, rather than increase the dither step-size of a waveplate that has no response, it is preferable to remain with a "good" waveplate as long as possible. A "good" waveplate is one that can be employed to change the SOP and/or produce a beneficial response. If there is at least one other waveplate that has a desired response, then it becomes possible to switch to this "good" waveplate, decide a correct rotation direction and keep rotating this waveplate while monitoring the feedback signal.

Assuming the goal is to try and minimize the feedback signal, the controller preferably rotates the waveplate continuously if the feedback signal decreases monotonically, and switches to the next waveplate if the feedback signal increases. This procedure is explained in more detail with regard to FIG. 4. After returning to a "bad" waveplate in a subsequent cycle, the process can more likely recover the response because other waveplates in the polarization controller have changed by large angles. Note that it is possible for a bad waveplate in one cycle to become a good waveplate in the next cycle.

For the second LC effect, the control speed is not sacrificed by increasing the number of waveplates in the polarization controller. Furthermore, the more waveplates, the larger the probability a good waveplate exists in the polarization controller.

Figure 4:
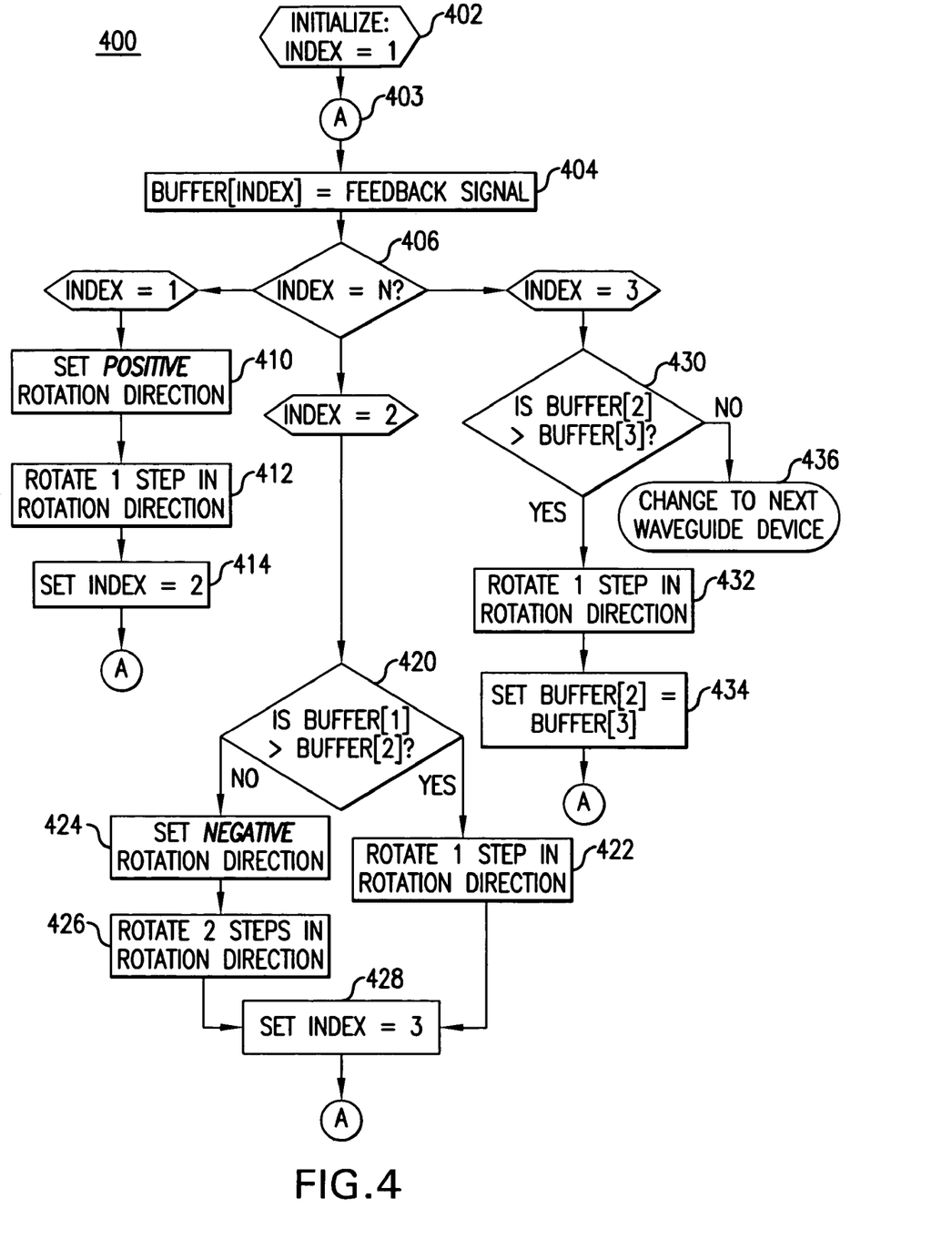
FIG. 4 illustrates a flow diagram in accordance with aspects of the present invention.

FIG. 4 is a flow diagram 400 that illustrates a preferred method of achieving a desired response for a given initial SOP in accordance with aspects of the present invention. In the example of flow diagram 400, it is desirable to decrease or minimize the feedback of the system, as will be described below. In an initialization step 402, an index value is set to one (1), identifying the first stage of the dithering and adjusting process for a selected waveplate. Point "A" at step 403 represents a stage in the process after initialization is performed. Then at step 404, a buffer is set equal to a feedback signal. The buffer desirably includes information concerning the SOP associated with the waveplate at a particular step in the polarization control process. The feedback signal is preferably the optical power after the polarization beam splitter. The feedback signal may be monitored throughout the polarization control process. Next, at step 406, the index value is checked. If the index value is one (1), the process proceeds to step 410, in which the rotation direction is set to a positive direction. Preferably, the positive direction is clockwise, although it may be counterclockwise.

Once the rotation direction is set, the waveplate is preferably dithered by one (1) step in step 412. Depending upon the type of waveplate, it may be dithered mechanically, electrically or by some other technique. The value of a single step in a preferred embodiment of the present invention is on the order of two (2) to three (3) degrees, although the step size may be larger or smaller, for example at least one (1) degree in some cases or less than ten (10) degrees in other cases. As discussed above, overcompensation is undesirable. Thus, in some situations, a step size greater than, e.g., ten (10) degrees may be too large. Similarly, in other situations, under-compensation of, e.g., much less than one (1) degree may not permit the polarization controller to move away from a dead spot rapidly enough. Therefore, in another preferred embodiment of the present invention, the step size is between one (1) and ten (10) degrees. In yet another preferred embodiment of the present invention, the step size is greater than one-half (0.5) degree and less than five (5) degrees. Once the waveplate is dithered, the index is preferably set to a value of two (2) in step 414, and then returns to the point A at step 403 in the flow diagram 400.

If the index value checked in step 406 is equal to two (2), the process desirably proceeds to step 420, wherein a pair of feedback signals are compared. Specifically, the current feedback signal of buffer[2] is compared to the previous feedback signal of buffer[1], which preferably includes state information prior to dithering the current waveplate (not shown). If the previous feedback signal of buffer[1] is greater than the current feedback signal of buffer[2], the process proceeds to step 422, otherwise it proceeds to step 424. If buffer[2] is smaller than buffer[1], this indicates that the dithering is reducing the feedback. Thus, in step 422, the waveplate is preferably dithered/rotated by an additional step along the direction set in step 410 to continue reducing the feedback signal. The additional step may be of the same or different size than that selected in step 412. However, if buffer[2] is the same or larger than buffer[1], this indicates that the initial dithering of step 412 is not reducing the feedback signal. In that case, a negative rotation direction is preferably set in step 424.

If the initial rotation direction of step 410 was clockwise, then the new rotation direction of step 424 is counterclockwise. Then in step 426 the waveplate is preferably dithered by rotating two steps in the new rotation direction. These two (2) steps may be of a different size than that selected in step 412, although they are both preferably the same size. After the rotation is performed in either step 422 or step 426, the index value is set to three (3) in step 428, and the process then returns to point A in step 403 of the flow diagram 400.

If the index value checked in step 406 is equal to three (3), the process proceeds to step 430, wherein the current feedback signal of buffer[3] is compared to the previous feedback signal of buffer[2]. If the previous feedback signal of buffer[2] is greater than the current feedback signal of buffer[3], the process proceeds to step 432, otherwise it proceeds to step 436. If buffer[3] is less than or equal to buffer[2], this indicates that the dithering is reducing the feedback. Thus, in step 432, the waveplate is preferably dithered/rotated by an additional step along the rotation direction. This additional step may be of the same or different size than that selected in step 412 or other steps in this process.

After the rotation is performed in step 432, the buffer[2] value is preferably set equal to the buffer[3] value in step 434, and the process then returns to point A at step 403 in the flow diagram 400. This enables the process to continue reducing the feedback signal. The system continues adjusting the current waveplate so long as the feedback signal is not increasing. However, if buffer[3] is greater than buffer[2], this indicates the dithering/manipulating of the current waveplate is not reducing the feedback signal. In that case, adjustment of the current waveplate desirably ceases and the process advances to a subsequent waveplate in the polarization controller in step 436.

Preferably, the subsequent waveplate is the next waveplate in the polarization controller. For example, if there are six waveplates in the polarization controller and the current waveplate is number 3, the next waveplate on which dithering will be performed is preferably number 4. Similarly, if the current waveplate is number 6, the next waveplate is preferably number 1.

It should be understood that instead of attempting to decrease or minimize the feedback signal, the system could be operated to achieve a different condition, such as increasing or maximizing the feedback signal. In that case, the buffer comparisons at steps 420 and 430 would be reversed. Specifically, if buffer[2] is greater than buffer[1] at step 420, this indicates the dithering is increasing the feedback signal. Thus, in step 422, the waveplate is preferably dithered/rotated by an additional step along the direction set in step 410 to continue reducing the feedback signal. The additional step may be of the same or different size than that selected in step 412. However, if buffer[2] is the same or less than buffer[1], this indicates the initial dithering of step 412 is not increasing the feedback signal. In that case, a negative rotation direction is set in step 424. Similarly, at step 430, if the previous feedback signal of buffer[2] is less than the current feedback signal of buffer[3], the process proceeds to step 436, otherwise it proceeds to step 432.

Figure 5:
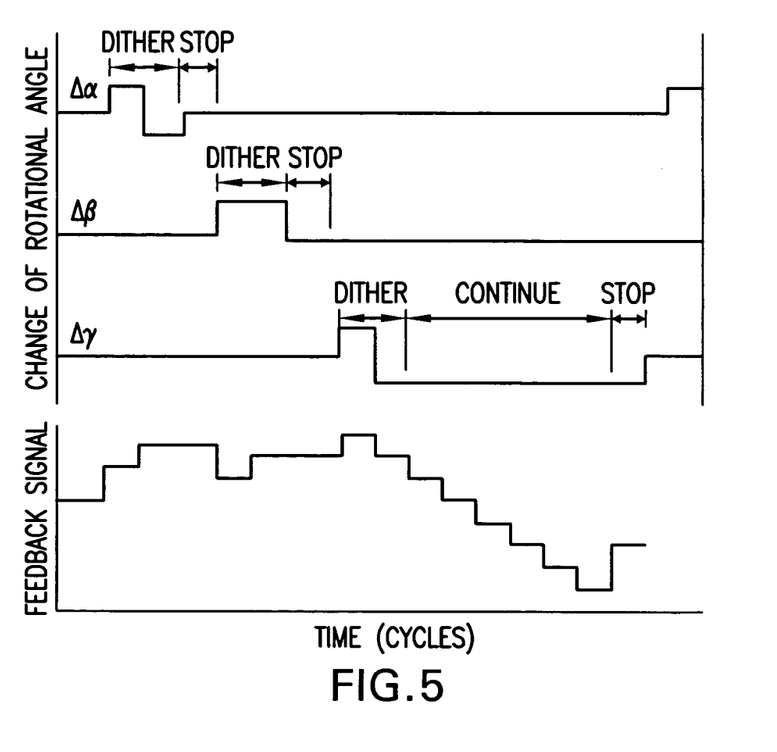
FIG. 5 illustrates a polarization control process in accordance with the flow diagram of FIG. 4.

FIG. 5 illustrates polarization control in accordance with system operation as described in relation to the flow diagram of FIG. 4. As shown in FIG. 5, if adjustments Δα and Δβ to waveplates 1 and 2, respectively, do not cause a reduction in the feedback signal, the system advances to adjusting waveplate 3. The process preferably continues adjusting waveplate 3 so long as there is a reduction in the feedback signal (assuming feedback minimization is desired). Once the feedback signal increases, adjustment Δγ to waveplate 3 preferably ceases and the system advances to the next waveplate, which in this illustration is waveplate 1. As discussed previously, if this had been a system having 4, 5, 6 or more waveplates, the adjustment would have advanced to the next waveplate, e.g. waveplate 4.

Figure 6:
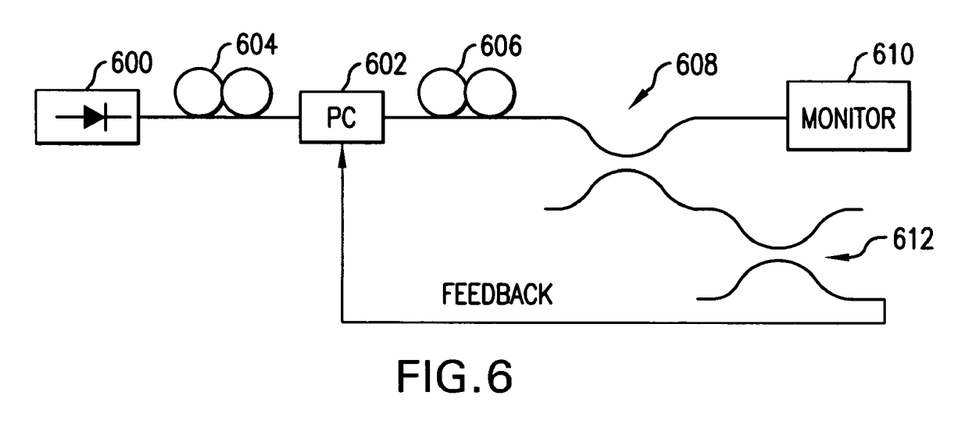
FIG. 6 is a schematic diagram of a polarization controller simulator.
Figure 7A:
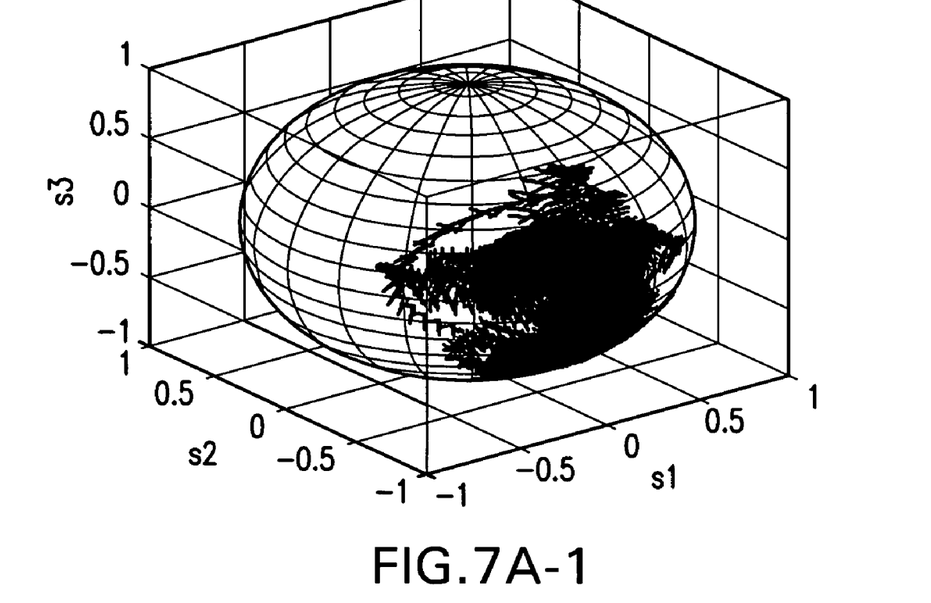
Figure 7A:
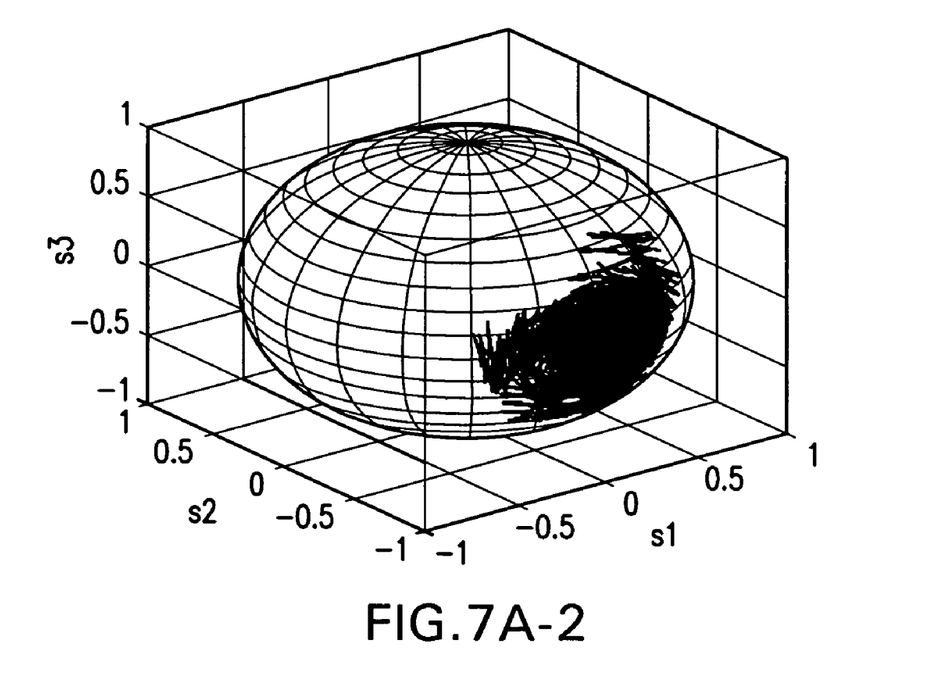
Figure 7B:
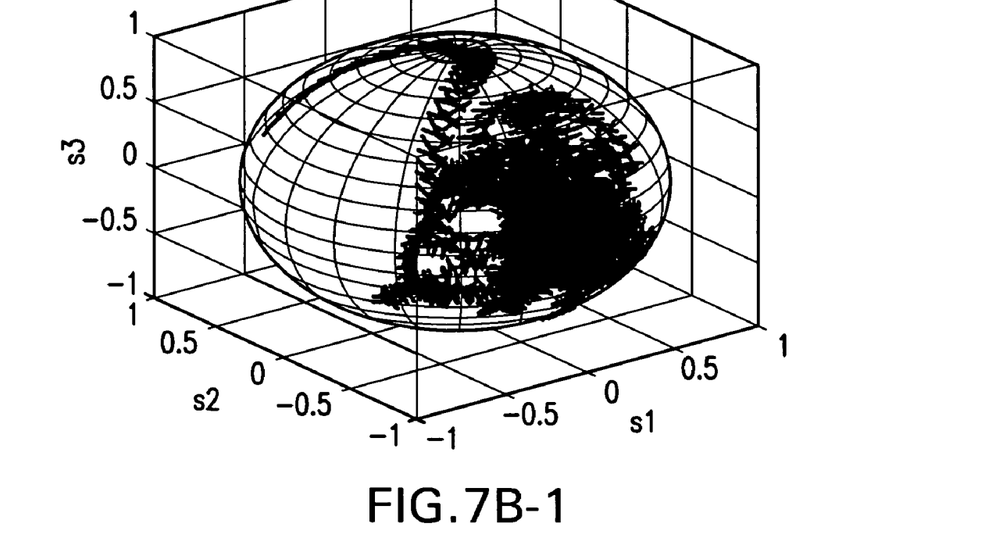
Figure 7B:
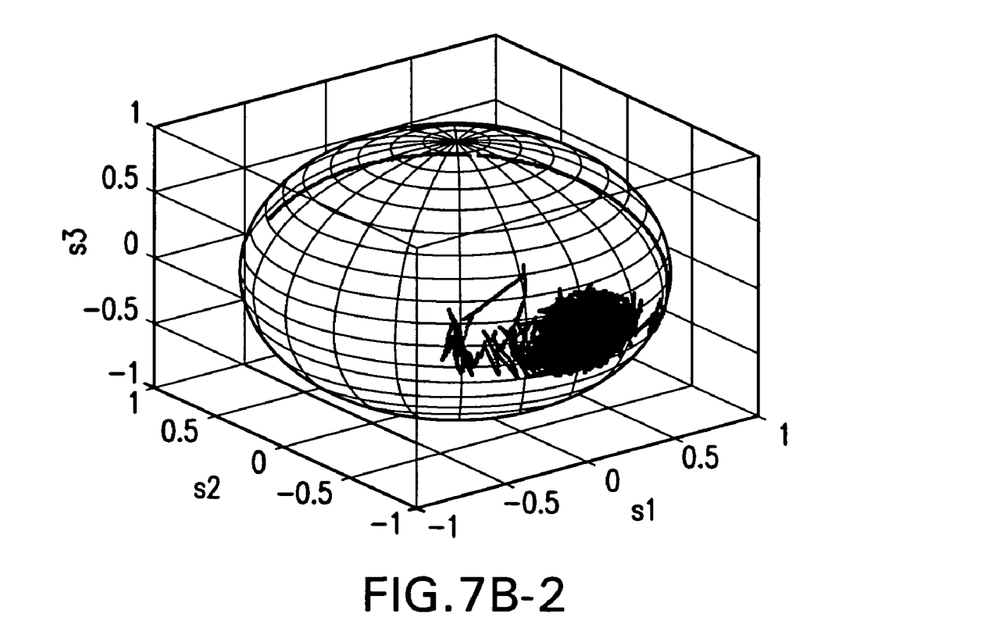
Figure 7C:
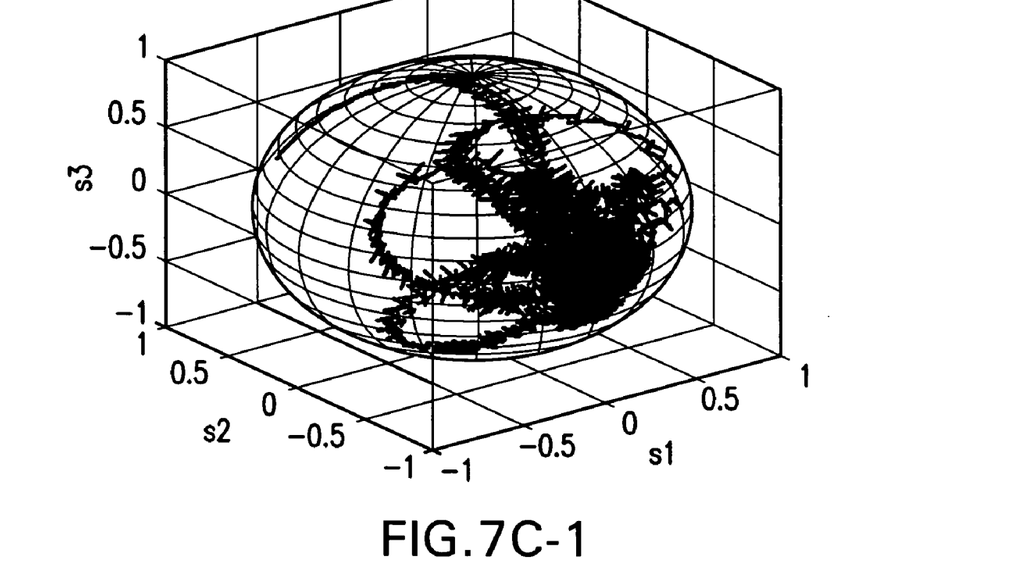
Figure 7C:
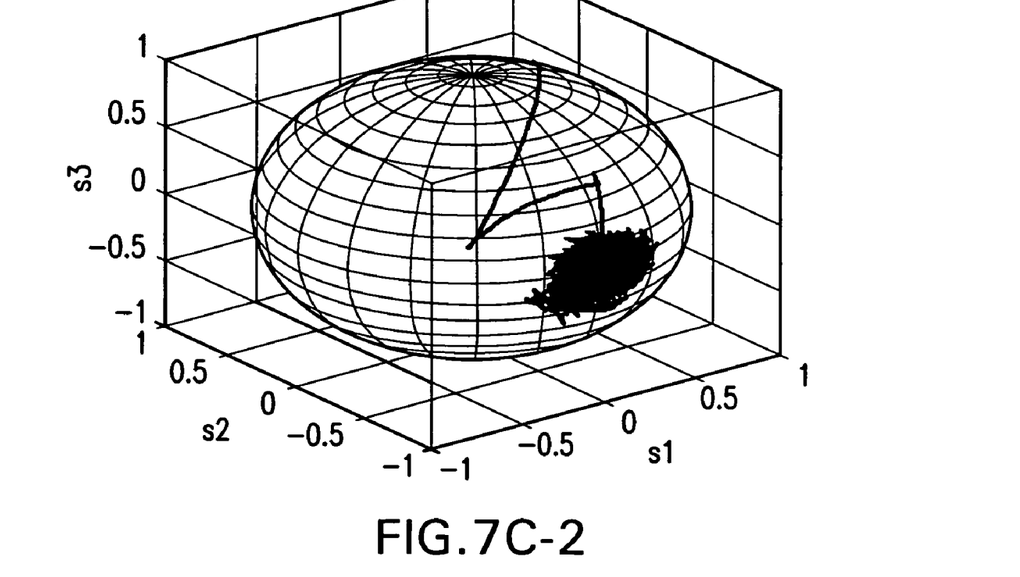

In order to compare the performance between the conventional dither algorithm and an algorithm in accordance with aspects of the present invention, a simulation was performed employing the structure shown in FIG. 6. A polarization controller 602 receives an input signal from a transmitter 600 through first polarization scrambler 604, and sends an output signal to a second polarization scrambler 606. The first and second polarization scramblers 604, 606 simulate single-mode long haul transmission fibers. It should be understood that multi-mode transmission fibers may also be used in accordance with the present invention. The output signal is then passed through a coupler 608 to a monitor 610 and to a polarization splitter 612. The monitor 610 evaluates the SOP, and the polarization splitter 612 provides a feedback signal to the polarization controller 602.

Three types of polarization controllers 602 were employed in the simulations. They were (1) QWP-HWP-QWP, (2) QWP-QWP-QWP-QWP-QWP, and (3) QWP-QWP-QWP-QWP-QWP-QWP. The waveplate angle was dithered by three (3) degrees (i.e., step size) every 100 us. The front scrambler adjusted the SOP by 3500 degrees/s, and the back scrambler adjusted the SOP by 350 degrees/s.

FIGS. 7(*a*)(1)–7(*c*)(2) compare the performances of the conventional dither process described above with reference to FIGS. 1–3 and a new control algorithm in accordance with aspects of the present invention for the three types of polarization controllers 602 using Poincare charts. FIGS. 7(*a*)(1), 7(*b*)(1) and 7(*c*)(1) are Poincare charts for the conventional process for the QWP-HWP-QWP, QWP-QWP-QWP-QWP-QWP and QWP-QWP-QWP-QWP-QWP-QWP polarization controllers, respectively. FIGS. 7(*a*)(2), 7(*b*)(2) and 7(*c*)(2) are Poincare charts for the processes of the instant application for the QWP-HWP-QWP, QWP-QWP-QWP-QWP-QWP and QWP-QWP-QWP-QWP-QWP-QWP polarization controllers, respectively. When viewing the conventional dithering process, it can be seen that the most effective performance occurred with the QWP-HWP-QWP polarization controller. There was no benefit by increasing the number of waveplates. On the other hand, when viewing FIGS. 7(*a*)(2), 7(*b*)(2) and 7(*c*)(2), it can be seen that the number of the LC effects is reduced significantly. For each given waveplate configuration, the Poincare charts illustrate that the present invention generated highly focused polarization results. Significant polarization control was achieved, in contrast to the conventional processing. Importantly, increasing the number of waveplates reduced the probability of the LC effects.

In addition to the simulations, experimental results were also obtained using the configuration of FIG. 6. An Agere Systems Inc. LiNbO$_3$ model 2722 system having 5 QWPs was used as the polarization controller 602. The second and the third QWPs were synchronized together to act as a HWP. The fifth QWP was not used. Therefore, the experimental polarization controller 602 had a QWP-HWP-QWP structure. One Agilent Technologies (HP) 11896A polarization scrambler was inserted before the polarization controller, acting as the polarization scrambler 604. The scrambling speed was set to a rotational rate of 360 degrees/s. After the polarization controller 602, an Agilent Technologies (HP) 8509B polarization analyzer was employed as the monitor 610 to monitor the output SOP.

Figure 8A:
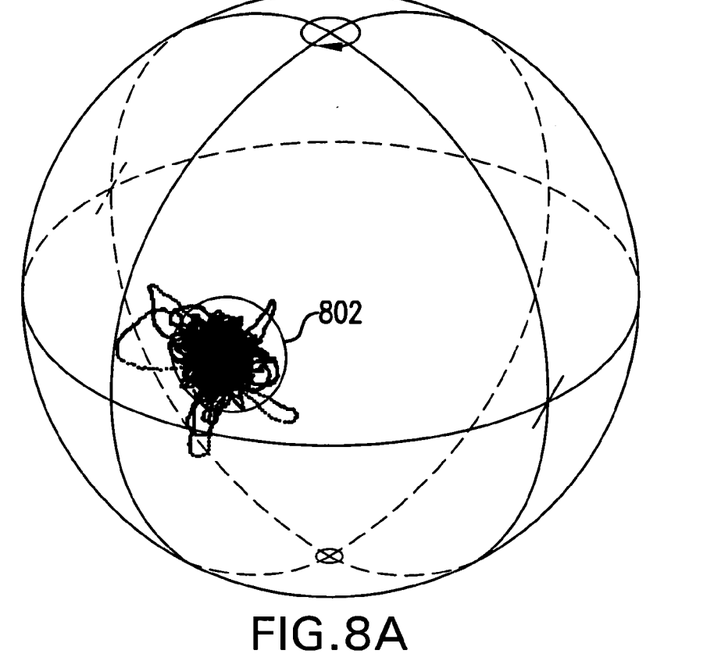
FIGS. 8(a)–(b) illustrate experimental results using Poincare charts to compare conventional polarization control techniques with polarization control methods in accordance with aspects of the present invention.
Figure 8B:
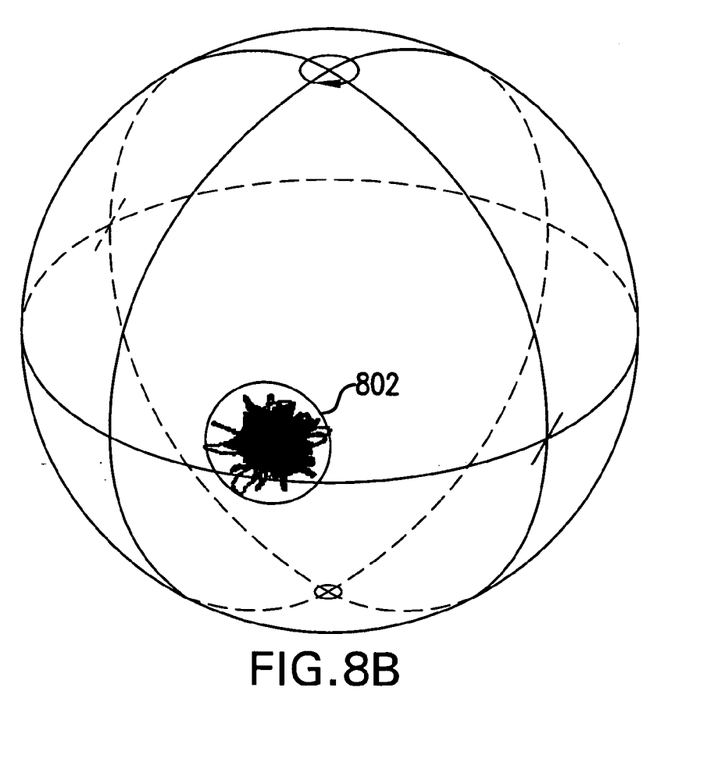

The experimental results are plotted on the Poincare charts in FIGS. 8(*a*) and 8(*b*). In the figures, circle 802 represents a "zone of acceptability" for the SOP. The desired polarization should be a single point on the Poincare sphere. However, due to the unwanted orthogonal polarization, this may not be the case. Thus, the zone of acceptability places a limit on the deviation due to the unwanted orthogonal polarization. As seen in the figures, the circle 802 on the surface of the Poincare sphere has a normalized radius of 0.198, which equates to a −20 dB suppression of the unwanted orthogonal polarization state. The amount of suppression may vary depending upon factors such as the number of waveplates employed. The −20 dB suppression value is a preferred value. In a preferred embodiment, the amount of suppression varies between −10 dB and −30 dB. In yet another embodiment, the amount of suppression may vary between −5 dB and −40 dB. The suppression may be higher or lower depending upon the characteristics of the system, cost constraints and other implementation details.

FIG. 8(*a*) illustrates the results of the conventional process described above with reference to FIGS. 1–3, and FIG. 8(*b*) illustrates the results of a process in accordance with aspects of the present invention. As seen in FIG. 8(*a*), the conventional process significantly oversteps the zone of acceptability. In contrast, when employing a process in accordance with aspects of the present invention, the output SOP illustrated in FIG. 8(*b*) is much more tightly controlled and barely reaches the outer boundary of the zone of acceptability at a few points. This indicates that the LC effects are substantially avoided.

Multiple or varied zones of acceptability may be utilized to achieve desired statistical results. For instance, in a preferred embodiment, the zone of acceptability may be set such that approximately 67% (or one standard deviation) of the SOP signal has a suppression of −40 dB. In another preferred embodiment, the zone of acceptability may be set such that approximately 95% (or two standard deviations) of the SOP signal has a suppression of −15 dB. In yet another preferred embodiment, the zone of acceptability may be set such that approximately one standard deviation of the SOP signal is suppressed on the order of −30 dB. and approximately two standard deviations of the SOP signal are suppressed on the order of −10 dB. In a further preferred embodiment, a first zone of acceptability may be set such that approximately one standard deviation of the SOP signal is suppressed by between −20 dB and −40 dB, and a second zone of acceptability may be set such that approximately two standard deviations of the SOP signal are suppressed by between −5 dB and −20 dB.

While the experimental system only tested the QWP-HWP-QWP configuration, it is apparent from the simulations that increasing the number of waveplates result in significant improvements to the output SOP. The primary limitation on the number of waveplates is cost. Thus, in preferred embodiments, the polarization controller may comprise between five (5) and eight (8) QWPs. In a situation where cost is not a factor, the polarization controller preferably includes between six (6) and twelve (12) QWPs. In a situation where cost is a significant factor, the polarization controller preferably includes between three (3) and six (6) QWPs. Desirably, the QWPs are not integrated or otherwise combined to form HWPs. Alternatively, it is possible to place two or more polarization controllers in tandem. This will enable off-the-shelf controller equipment to be employed.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A polarization control method, comprising:
   receiving an input optical signal at a first waveplate, the input optical signal having a state of polarization associated therewith;
   selecting a first rotation direction for the first waveplate;
   rotating the first waveplate a first step amount along the first rotation direction to adjust the state of polarization of the input optical signal;
   monitoring a feedback signal to assess the efficacy of rotating the first waveplate; and
   continuing rotation of the first waveplate for a non-fixed time period while the feedback signal satisfies a first condition.

2. The method of claim 1, wherein the first condition is associated with feedback minimization.

3. The method of claim 1, wherein the first condition is associated with feedback maximization.

4. The method of claim 1, wherein continuing the rotation of the first waveplate includes incrementing by the first step amount for each rotation.

5. The method of claim 1, wherein the first step amount is at least one degree.

6. The method of claim 1, wherein the first step amount is less than ten degrees.

7. The method of claim 1, wherein the first step amount is between about two and three degrees.

8. The method of claim 1, further comprising:
   further rotating the first waveplate along the first rotation direction if the feedback signal satisfies a second condition;
   selecting a reverse rotation direction if the feedback signal does not satisfy the second condition; and
   rotating the first waveplate a second step amount along the reverse rotation direction if the feedback signal does not satisfy the second condition.

9. The method of claim 8, wherein the second condition is a minimization condition, further rotating the first waveplate occurs if the feedback signal satisfies the second condition, selecting the reverse rotation direction occurs if the feedback signal does not satisfy the second condition, and rotating the first waveplate occurs if the feedback signal does not satisfy the second condition.

10. The method of claim 8, wherein the second condition is a maximization condition, further rotating the first waveplate occurs if the feedback signal satisfies the second condition, selecting the reverse rotation direction occurs if the feedback signal does not satisfy the second condition, and rotating the first waveplate occurs if the feedback signal does not satisfy the second condition.

11. The method of claim 8, wherein the first waveplate is further rotated along the first direction of rotation by the first step amount.

12. The method of claim 8, wherein the first rotation direction is clockwise.

13. The method of claim 8, wherein the first rotation direction is counterclockwise.

14. The method of claim 8, wherein the second step amount has a value double the first step amount.

15. The method of claim 8, wherein the first and second conditions are monotonically decreasing conditions.

16. The method of claim 8, wherein the first and second conditions are monotonically increasing conditions.

17. The method of claim 1, further comprising:
ceasing the continued rotation of the first waveplate once the feedback signal does not satisfy the first condition;
selecting a second waveplate;
selecting an initial rotation direction for the second waveplate;
rotating the second waveplate along the initial rotation direction a second step amount to adjust the state of polarization;
monitoring the feedback signal to assess the efficacy of rotating the second waveplate; and
continuing rotation of the second waveplate while the feedback signal satisfies a second condition.

18. The method of claim 17, further comprising:
further rotating the second waveplate along the initial rotation direction if the feedback signal satisfies a third condition;
selecting a reverse rotation direction if the feedback signal does not satisfy the third condition; and
rotating the second waveplate a third step amount along the reverse rotation direction if the feedback signal does not satisfy the third condition.

19. The method of claim 17, wherein the second step amount is equal to the first step amount, and the third step amount has a value double the first step amount.

20. The method of claim 17, wherein the initial rotation direction of the second waveplate is the same as the first rotation direction for the first waveplate.

21. The method of claim 17, wherein continuing the rotation of the second waveplate includes incrementing by the second step amount for each rotation.

22. A method of controlling a state of polarization, comprising:
providing a plurality of waveplates;
continually adjusting a first one of the plurality of waveplates along a first rotation direction for a non-fixed time period while a feedback signal satisfies a first condition;
ceasing adjusting the first waveplate if the feedback signal does not satisfy the first condition;
continually adjusting a second one of the plurality of waveplates along a second rotation direction for a non-fixed time period while the feedback signal satisfies a second condition;
ceasing adjusting the second waveplate if the feedback signal does not satisfy the second condition;
continually adjusting a third one of the plurality of waveplates along a third rotation direction for a non-fixed time period while the feedback signal satisfies a third condition; and
ceasing adjusting the third waveplate if the feedback signal does not satisfy the third condition.

23. The method of claim 22, wherein the first rotation direction, the second rotation direction and the third rotation direction are all clockwise.

24. The method of claim 22, wherein the first rotation direction, the second rotation direction and the third rotation direction are all counterclockwise.

25. The method of claim 22, wherein the waveplates are arranged in a serial fashion and are adjusted sequentially.

26. The method of claim 22, wherein each of the waveplates functions as a quarter wave plate.

27. The method of claim 26, wherein the quarter wave plates are not associated together as a half wave plate.

28. The method of claim 22, wherein the first, second and third conditions values are equivalent.

29. The method of claim 22, wherein the plurality of waveplates comprise a polarization controller.

30. The method of claim 22, wherein a first subset of the plurality of waveplates comprises a first polarization controller, and a second subset of the plurality of waveplates comprises a second polarization controller.

31. The method of claim 22, wherein the first, second and third conditions are selected such that the state of polarization is confined within a zone of acceptability.

32. The method of claim 31, wherein the zone of acceptability represents suppression of unwanted orthogonal polarization of about −20 dB.

33. The method of claim 31, wherein the zone of acceptability represents a suppression of unwanted orthogonal polarization of between −5 dB and −40 dB.

34. The method of claim 31, wherein the zone of acceptability is selected to minimize loss control effects.

35. The method of claim 22, further comprising receiving an input optical signal at the first waveplate from an input single-mode optical fiber.

36. The method of claim 35, further comprising transmitting an output optical signal from the final waveplate to an output single-mode optical fiber.

37. The method of claim 35, wherein the input optical signal comprises at least one pair of channels, the pair of channels being orthogonally polarized with respect to each other.

38. The method of claim 22, further comprising:
determining an initial rotation direction; and
rotating the first waveplate one step along the initial rotation direction prior to continually adjusting the first waveplate.

39. The method of claim 38, further comprising:
if the feedback signal satisfies the first condition after rotating the first waveplate the one step, setting the first rotation direction equal to the initial rotation direction; and
if the feedback signal does not satisfy the condition after rotating the first waveplate the one step, setting the first rotation direction equal to a reverse rotation direction.

40. A polarization control system, comprising:
a first optical transmission medium capable of receiving an input optical signal having an input state of polarization;
a plurality of waveplates operatively connected together, a first one of the waveplates being operable to receive the input optical signal from the first optical transmission medium;
a second optical transmission medium capable of receiving an output optical signal having an output state of polarization from a last one of the waveplates; and
polarization control logic operable to modify the input state of polarization so that the output state of polarization is obtained having a predetermined polarization criterion;

wherein the polarization control logic is operable to select a first direction of rotation for the first waveplate, to rotate the first waveplate a first step amount along the first direction of rotation to adjust the input state of polarization, to monitor a feedback signal to assess the efficacy of rotating the first waveplate, and to continue rotating the first waveplate for a non-fixed time period while the feedback signal satisfies a first condition.

41. The polarization control system of claim 40, wherein the plurality of waveplates is between five and eight waveplates.

42. The polarization control system of claim 40, wherein the plurality of waveplates is between three and twelve waveplates.

43. The polarization control system of claim 40, wherein the waveplates are arranged in a serial fashion.

44. The polarization control system of claim 43, wherein the waveplates are adjusted sequentially by the polarization control logic.

45. The polarization control system of claim 40, wherein each of the waveplates functions as a quarter wave plate.

46. The polarization control system of claim 40, wherein the plurality of waveplates comprises a polarization controller.

47. The polarization control system of claim 40, wherein a first subset of the plurality of waveplates comprises a first polarization controller and a second subset of the plurality of waveplates comprises a second polarization controller.

48. The polarization control system of claim 40, wherein at least some of the waveplates are selected from the group consisting of a LiNbO$_3$ component, a liquid crystal, a fiber loop and a fiber squeezer.

49. The polarization control system of claim 40, wherein the predetermined polarization criterion is a zone of acceptability.

50. A polarization control system, comprising:
 a first optical transmission medium capable of receiving an input optical signal having an input state of polarization;
 a plurality of waveplates operatively connected together, a first one of the plurality of waveplates being operable to receive the input optical signal from the first optical transmission medium;
 a second optical transmission medium capable of receiving an output optical signal having an output state of polarization from a last one of the plurality of waveplates; and polarization control logic operable to modify the input state of polarization such that the output state of polarization is obtained having a predetermined polarization criterion;

wherein the polarization control logic is operable to continually adjust the first waveplate along a first rotation direction for a non-fixed time period while a feedback signal satisfies a first condition, to cease adjusting the first waveplate if the feedback signal does not satisfy the first condition, to continually adjust a second one of the plurality of waveplates along a second rotation direction for a non-fixed time period while the feedback signal satisfies a second condition, to cease adjusting the second waveplate if the feedback signal does not satisfy the second condition, to continually adjust a final waveplate along a last rotation direction for a non-fixed time period while the feedback signal satisfies a third condition, and to cease adjusting the final waveplate if the feedback signal does not satisfy the third condition.

51. A polarization control apparatus, comprising:

a plurality of waveplates operatively connected together, a first one of the waveplates being operable to receive an input optical signal having an input state of polarization;

polarization control logic operable to modify the input state of polarization such that an output state of polarization is obtained at a last one of the waveplates, the output state of polarization having a predetermined polarization criterion; and a feedback means operable to provide feedback information from the plurality of waveplates to the polarization control logic;

wherein the polarization control logic is operable to select a first direction of rotation for the first waveplate, to rotate the first waveplate a first step amount along the first direction of rotation to adjust the input state of polarization, to monitor the feedback information to assess the efficacy of rotating the first waveplate, and to continue rotating the first waveplate for a non-fixed time period while the feedback information satisfies a first condition.

* * * * *